F. C. DE VALLANT.
HAND PROPELLED DUST COLLECTOR.
APPLICATION FILED JAN. 27, 1910.
965,694.
Patented July 26, 1910.
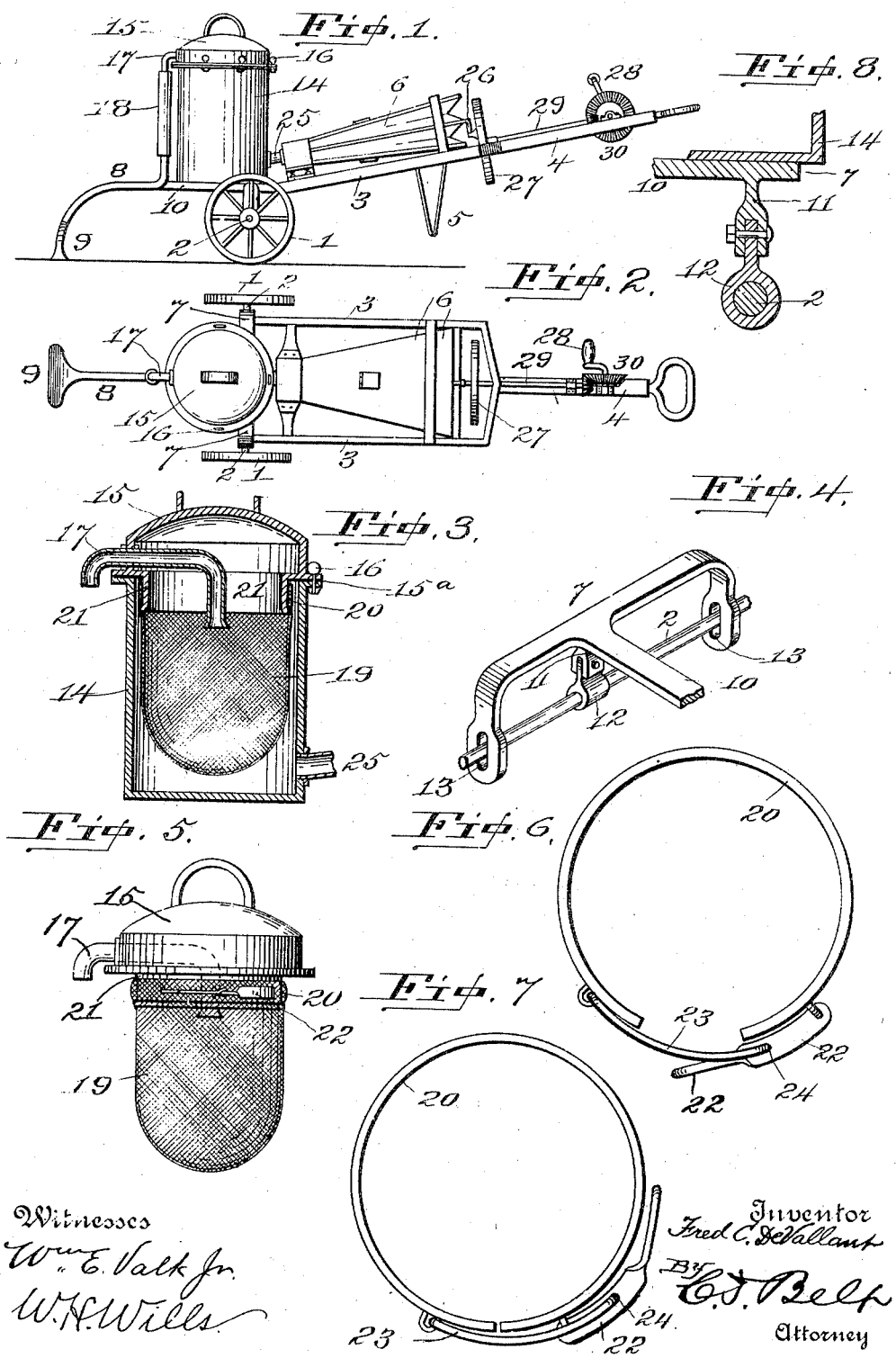

UNITED STATES PATENT OFFICE.

FRED C. DE VALLANT, OF EARLVILLE, NEW YORK.

HAND-PROPELLED DUST-COLLECTOR.

965,694. Specification of Letters Patent. Patented July 26, 1910.

Application filed January 27, 1910. Serial No. 540,403.

*To all whom it may concern:*

Be it known that I, FRED C. DE VALLANT, a citizen of the United States, residing at Earlville, in the county of Madison and State of New York, have invented certain new and useful Improvements in Hand-Propelled Dust-Collectors, of which the following is a specification.

This invention relates to dust collectors, and pertains especially to the class of transportable hand operated pneumatic dust collectors.

The object of the invention is to provide an improved, simplified, roller or truck device, adapted to be propelled by hand over a floor or carpet during simultaneous working by hand of a bellows carried by the truck, for collecting dust into a can or similar vessel carried by the truck and connected with the bellows.

A further object of the invention is to provide a truck for dust collectors, with a nozzle frame carried by and loosely mounted on the truck axle so that the latter may have vertical pivot movement in the frame, a nozzle stem rigid with the frame so as to be turned laterally with the truck and at the same time adjust itself to the floor by reason of said vertical movement of the axle.

A still further object of the invention is to provide novel and peculiar connections between the dust bag and dust can cover and between the latter and the can to permit of the removal of the cover and the bag together from the can without uncovering the bag.

Other objects, advantages and improved results are attainable through and by the special arrangement and construction of the various parts of the device, hereinafter to be fully described.

In the accompanying drawings forming part of this application: Figure 1 is a side elevation. Fig. 2 is a top view. Fig. 3 is an enlarged sectional view of the dust can. Fig. 4 is a perspective view of the nozzle frame and axle partly broken away. Fig. 5 is a detail elevation of the can cover showing the dust bag suspended therefrom and covered thereby. Fig. 6 is an edge or top view of the clamping ring open. Fig. 7 is a similar view showing the ring closed. Fig. 8 is a sectional view through the axle and its coupling.

The same reference numerals denote the same parts throughout the several views of the drawings.

The truck wheels 1 are mounted on an axle 2, journaled in a truck frame 3, from which extends a hand rod 4 for propelling the truck. Such rod having a floor rest or support 5. And said frame supports and has attached to it a bellows 6, hereinafter more particularly referred to.

In order to provide means whereby the nozzle may be adjusted laterally and longitudinally, and yet be turnable with the truck in its various propelled directions, I provide a nozzle supporting frame 7, having the stem 8 of a nozzle 9 rigidly connected thereto by an arm 10 central of the frame, and at the intersection of the frame and the stem there is a depending post or projection 11, pivoted to a collar 12 in which the axle 2 revolves. Such collar and pivot connection permits the frame to be swung on the axle so as to adjust the nozzle vertically during the propelling of the truck in a dust cleaning operation.

The axle extends from the collar 12 through slots 13 in the depending ends of the frame for the purpose of limiting the relative vertical movement of the frame and the axle. Said frame 7 extends lengthwise the axle and is pivoted above the center thereof, so that the axle and its wheels may have free vertical movement in the slots 13 without imparting such movement to the floor nozzle, and without swinging or tilting the truck and the nozzle lengthwise. Such lengthwise movement being accomplished by means of the collar 12 turnable on the axle. These two pivot movements afford means whereby the nozzle may always be in working contact with the carpet or floor irrespective of the position of the truck wheels.

A dust can 14 is mounted on and secured to the frame 7, preferably forward of the axle 2, and has a cap or cover 15 detachably secured to the can by means of thumb-screws 16 extending through peripheral flanges of the cap and can. The cap or cover 15 has a double elbow pipe 17, one end of which projects downwardly within the cover and the other end projects downwardly outside the cover and is connected with the nozzle stem 8 by a hose or pipe 18.

One of the essential features of novelty and advantage of this invention is in connecting the dust bag to the can cover so that such cover may not be removed from the sack or bag in removing the cover and the bag from the can. The sack or bag 19 is fixed to an open spring ring or band 20, having over-lapping ends adapted to be clamped around a neck or depending flange 21 of the can cap or cover 15, and the bag is suspended in the can by placing the cover thereon, and in removing or replacing the cover the elbow pipe is detached and attached to its hose pipe 18, so that the cover, the elbow pipe and the dust sack or bag is removable from the can intact, thereby keeping the dust bag closed after its removal. The device for clamping the spring band or ring 20 to the cover neck 21, consists of a lever 22 pivoted to one end of the band, and a link 23 pivoted to the band adjacent its other end and fulcrumed to the lever at 24. It is obvious that by moving the lever 22 the band may be opened and closed, as clearly shown in Figs. 6 and 7. The can cover is fitted with a rubber gasket 15ª, for making an air-tight joint between the cover and the can.

The bellows 6 is connected to the can by a pipe 25, and is operated by means of a crank-shaft 26 having a balance-wheel 27, and operated by a beveled gear and pinion 30 connected to a hand crank 28 by a shaft 29.

It will be seen that the parts are arranged to balance on the truck wheels, so as to assist the pivot movement hereinbefore described.

Having thus described my invention what I claim as new and desire to secure by Letters Patent is:

1. In a hand propelled dust collector, the combination, with a truck including a wheeled axle, a dust can, and a suction creating means mounted on the truck and connected with the can, of a frame supporting the can and having slotted ends through which the ends of the axle work, a pivot connection between the axle and the frame, and a floor nozzle suspended from the frame in communication with the can.

2. In a dust collector, the combination, with a truck, including a wheeled axle, suction creating means carried by the truck, a dust can in connection with such means, and a floor nozzle connected with the can, of a frame supporting the can and having the floor nozzle rigidly connected thereto, and means for pivotally connecting the said frame with the truck axle.

3. In a pneumatic dust collector, the combination, with a dust can having a pump and a floor nozzle connected therewith, and a truck supporting the can, of a frame to which the nozzle is fixed, and means connecting the truck axle with the frame so as to permit vertical pivot movement of the axle in the frame without imparting such movement to the nozzle.

4. In a pneumatic dust collector, the combination, with a dust can, a pump connected with the can, a floor nozzle, means connecting the nozzle with the can, and a wheeled axle, of a frame supporting the can and having an arm from which the nozzle depends, and means connecting the axle with the frame so that the axle may have vertical movement in the frame.

5. The combination, with a truck including a wheeled axle for supporting and propelling a dust collector, of a frame having a post to which the axle is rotatably and pivotally connected, the ends of the frame having slots through which the axle extends for limiting its pivot movement, a pump on the truck and a floor nozzle in communication with the pump and projecting from the frame and adapted to adjust itself relative to such pivot movement of the axle.

In witness whereof I hereunto set my hand in the presence of two witnesses.

FRED C. DE VALLANT.

Witnesses:
C. D. NASH,
H. C. RAWLEY.